(12) United States Patent
Nakanishi et al.

(10) Patent No.: US 12,459,413 B2
(45) Date of Patent: Nov. 4, 2025

(54) HEADREST AND METHOD FOR MANUFACTURING THE SAME

(71) Applicant: TOYOTA BOSHOKU KABUSHIKI KAISHA, Aichi-ken (JP)

(72) Inventors: Masashi Nakanishi, Aichi-ken (JP); Jun Jin, Gifu-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 275 days.

(21) Appl. No.: 17/948,634

(22) Filed: Sep. 20, 2022

(65) Prior Publication Data

US 2023/0138765 A1    May 4, 2023

(30) Foreign Application Priority Data

Oct. 29, 2021 (JP) ................................. 2021-177375

(51) Int. Cl.
| | |
|---|---|
| *B60N 2/809* | (2018.01) |
| *B29C 70/70* | (2006.01) |
| *B60N 2/80* | (2018.01) |

(52) U.S. Cl.
CPC .............. *B60N 2/809* (2018.02); *B29C 70/70* (2013.01); *B60N 2002/899* (2018.02)

(58) Field of Classification Search
CPC . B60N 2002/899; B60N 2/5883; B60N 2/809
See application file for complete search history.

(56) References Cited

U.S. PATENT DOCUMENTS

| | | | | |
|---|---|---|---|---|
| 6,068,338 A | * | 5/2000 | Takei | B60N 2/5883 |
| | | | | 297/391 |
| 2004/0036329 A1 | * | 2/2004 | Ashton | B60N 2/5883 |
| | | | | 297/220 |
| 2018/0037145 A1 | * | 2/2018 | Moroi | B60N 2/5883 |

FOREIGN PATENT DOCUMENTS

| | | | | |
|---|---|---|---|---|
| EP | 0322374 B1 | * | 4/1991 | ............... B60N 2/80 |
| JP | S57-037349 U | | 2/1982 | |
| JP | S63-124899 U | | 8/1988 | |
| JP | H11-348631 A | | 12/1999 | |

(Continued)

OTHER PUBLICATIONS

Tamai, Headrest, Apr. 1, 2021, JP 2021049799, Written description, English translation (Year: 2021).*

(Continued)

*Primary Examiner* — David R Dunn
*Assistant Examiner* — Tania Abraham
(74) *Attorney, Agent, or Firm* — Greenblum & Bernstein, P.L.C.

(57) ABSTRACT

A headrest includes an insert member covering a gate-shaped stay other than both legs of the gate-shaped stay, a pad body covering the insert member other than a lower surface of the insert member, a cover having a bag-shape, covering the pad body, and forming an outer shape of a headrest main body, and a strip-shaped plate member attached to an end edge of the cover between the legs in a state where the cover covers the insert member and the legs protrude outward through a cover opening of the cover. The lower surface of the insert member is provided with an insert opening extending in a headrest width direction and disposed between the legs, and the cover is attached to the insert member in a state where the plate member is inserted into the insert opening with the end edge of the cover.

5 Claims, 7 Drawing Sheets

(56) References Cited

FOREIGN PATENT DOCUMENTS

| | | | |
|---|---|---|---|
| JP | 2021-049799 A | 4/2021 | |
| WO | WO-2018064686 A9 * | 6/2018 | ............... B60N 2/80 |

OTHER PUBLICATIONS

Japanese Office Action in counterpart Japanese Application No. JP 2021-177375, dated Jan. 7, 2025 (along with English translation thereof).

* cited by examiner

HEADREST AND METHOD FOR MANUFACTURING THE SAME

CROSS REFERENCE TO RELATED APPLICATIONS

This application is based on Japanese Patent Applications No. 2021-177375 filed on Oct. 29, 2021, the entire contents of which are incorporated herein by reference.

TECHNICAL FIELD

The present invention relates to a headrest and a method for manufacturing the same.

BACKGROUND ART

In related art, a headrest for automobile seat includes an insert member attached with a stay, a pad body that is a cushion member covering the insert member, and a cover as a cover member covering the pad body and forming an outer shape. JP-A-2021-49799 discloses an example of such a headrest. The headrest described in JP-A-2021-49799 has a structure in which an end edge of a bag-shaped cover is locked to a bottom of an inner cover corresponding to the insert member, and the inner cover is covered with an outer cover from below, thereby hiding the end edge of the cover.

In the headrest disclosed in JP-A-2021-49799, the end edge is hidden when the outer cover is attached after locking the end edge of the cover to the inner cover regardless of the structure for locking, which has no problem in appearance. However, the outer cover is required, which increases the number of components.

SUMMARY OF INVENTION

In view of such a problem, an object of the present invention is to provide a headrest having a good appearance quality while preventing an increase in the number of components, and a method for manufacturing the same.

According to a first aspect of the invention, a headrest includes:
- an insert member covering a gate-shaped stay other than both legs of the gate-shaped stay;
- a pad body having a cushion member covering the insert member other than a lower surface of the insert member, the lower surface being formed on a leg side of the headrest;
- a cover having a bag-shape, covering the pad body, and forming an outer shape of a headrest main body; and
- a strip-shaped plate member attached to an end edge of the cover at a position between the legs in a state where the cover covers the insert member and the legs protrude outward through a cover opening of the cover, In the headrest, the lower surface of the insert member is provided with an insert opening extending in a headrest width direction and disposed between the legs, and the cover is attached to the insert member in a state where the plate member is inserted into the insert opening together with the end edge of the cover.

In the first aspect of the invention, the cover is attached to the insert member provided with the pad body by inserting and locking the plate member attached to the end edge of the bag-shaped cover into the grained groove provided in the insert member together with the end edge. Accordingly, the appearance is not impaired even if the lower side of the headrest main body with the cover attached to the lower surface of the insert member is not covered with an outer cover attached thereto. Therefore, it is possible to obtain a headrest having good appearance quality while preventing an increase in the number of components without using a component such as an outer cover.

According to a second aspect of the invention, a method for manufacturing a headrest including an insert member covering a gate-shaped stay other than both legs of the gate-shaped stay, a pad body having a cushion member covering the insert member other than a lower surface of the insert member, the lower surface being formed on a leg side of the headrest, a cover having a bag-shape, covering the pad body, and forming an outer shape of a headrest main body, and a strip-shaped plate member attached to an end edge of the cover which corresponds to a portion of the insert member between the legs in a state where the cover covers the insert member and each of the legs protrudes outward through a cover opening of the cover, the lower surface of the insert member being provided with an insert opening extending in a headrest width direction and disposed between the legs, and the cover being attached to the insert member in a state where the plate member is inserted into the insert opening together with the end edge of the cover, includes:
- preparing the insert member to which the gate-shaped stay is attached and having the insert opening on the lower surface;
- preparing the cover with the plate member attached to the end edge;
- preparing a mold having a cavity of a shape corresponding to the outer shape of the headrest main body;
- setting the insert member and the cover in the cavity of the mold with both legs protruding out of the cavity, in a state where the insert member is inserted into the cover from the cover opening and the plate member is inserted into the insert opening together with the end edge of the cover;
- injecting a urethane foam raw material into the cover set in the mold and foaming and curing the urethane foam raw material between the insert member and the cover to form the pad body and integrate the insert member, the cover and the pad body; and
- demolding the headrest in which the cover is integrated with the insert member via the pad body.

In the second aspect of the invention, since the formation of the outer shape of the headrest main body and the integration of the cover, the pad body, and the insert member can be performed at the same time by the integral foam molding of the pad body, the headrest of the first aspect of the invention can be manufactured rationally.

According to third aspect based on the second aspect,
- in the preparation of the cover, in the state where the insert member is inserted into the cover, the cover has overlapping portions as tick portions at outer sides of the legs protruding from the cover opening in the headrest width direction,
- in the setting of the insert member and the cover, in the state where the insert member is inserted into the cover, the overlapping portions are arranged in a compressed state between the lower surface of the insert member and a surface of the cavity at outer side of the legs in the headrest width direction.

In the third aspect of the invention, it is possible to prevent damage to the appearance quality of the lower side of the headrest main body due to foaming and curing of the urethane foam raw material leaked to the lower surface of the insert member during the process of integral foam molding of the pad body. By enlarging the opening, the insert member can be inserted into the cover even in a shape in which the insert member protrudes outward in the headrest width direction of both legs, and it is possible to prevent damage to the appearance quality of the lower side of the headrest main body without using a component such as an outer cover.

DESCRIPTION OF EMBODIMENTS

Figure 1:
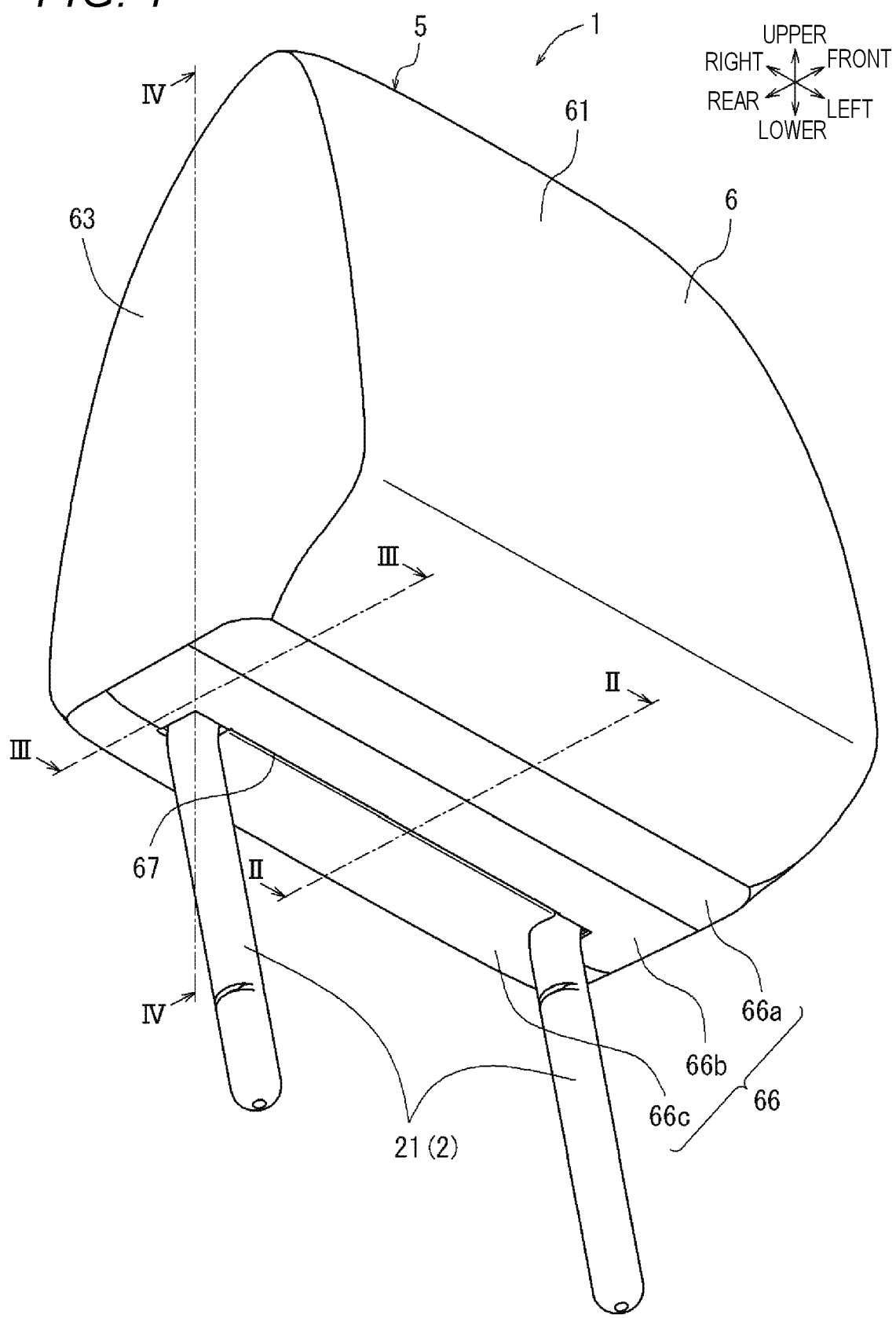
FIG. 1 is a perspective view of a headrest as viewed obliquely from below.

FIGS. 1 to 4 show an embodiment of the present invention. The embodiment is an example in which the present invention is applied to a headrest 1 for automobile seat. In the drawings, the arrows indicate the respective directions of the headrest 1 and an automobile seat when the headrest 1 is attached to the automobile seat. In the following description, descriptions on directions are made with reference to these directions.

As shown in FIGS. 1 to 4, the headrest 1 includes an insert member 3 attached with a gate-shaped headrest stay 2, a pad body 4 that is a cushion member partially covering the insert member 3, and a cover 6 that is a cover member covering the pad body 4 and forming an outer shape of a headrest main body 5. Here, the headrest stay 2 corresponds to the "stay".

The headrest stay 2 is formed by bending a metal pipe, and includes a pair of left and right legs 21 extending parallel to each other in a substantially vertical direction, and a horizontal portion 22 connecting upper ends of both legs 21 to each other. The lower end side of each of both legs 21 is inserted into a headrest support (not shown) disposed on the upper portion of a seat back (not shown) of the automobile seat, whereby the headrest 1 is attached to the automobile seat.

The insert member 3 is a hollow member made of resin, and is formed by integrating a front member 31 on the front side and a rear member 32 on the rear side in a state in which the upper end side of both legs 21 of the headrest stay 2 and the horizontal portion 22 are disposed between the front member 31 and the rear member 32. The front member 31 has a substantially rectangular container shape that opens substantially rearward, and has a plurality of ribs for ensuring the rigidity and supporting the headrest stay 2 provided inside. Similarly, the rear member 32 has a substantially rectangular container shape that opens substantially forward, and has a plurality of ribs for ensuring the rigidity and supporting the headrest stay 2 provided inside. When viewed from the front, the outer shapes of the front member 31 and the rear member 32 coincide with each other, and the front member 31 and the rear member 32 are joined in a hollow shape with the headrest stay 2 interposed between the front member 31 and the rear member 32, whereby the headrest stay 2 is integrated with the insert member 3. The insert member 3 has a substantially rectangular box shape, and has a lower surface 33 provided with a pair of left and right stay holes 34 for allowing both legs 21 of the headrest stay 2 to pass through and a slit 35 extending in the left-right direction between the pair of stay holes 34. The width dimension of the slit 35 in the front-rear direction is set to be approximately the sum of twice the thickness of a plate 68 to be described later and twice the thickness of the cover 6. Here, the slit 35 corresponds to the "inset opening".

The cover 6 is formed in a bag shape opened downward, obtained by sewing and integrating a plurality of pieces cut from a cover material in which a slab urethane having a low air permeability (about 1 $cc/cm^2 \cdot sec$ to 10 $cc/cm^2 \cdot sec$) is laminated on the back surface side of cloth such as fabrics, genuine leather, synthetic leather, or the like. The slab urethane prevents the molding material of the pad body 4 from reaching cloth such as fabrics, genuine leather, synthetic leather, or the like at the time of foam molding of the pad body 4, and also contributes to imparting soft feel to the cover 6. Specifically, the cover 6 includes a front piece 61 corresponding to a portion to be in contact with the head of the seated person, a rear piece 62 on the rear side, a right piece 63 on the right side, a left piece 64 on the left side, an upper piece 65 on the upper side, and a lower piece 66 on the lower side. The lower piece 66 is divided into three pieces in the front-rear direction, including a lower front piece 66a, a lower middle piece 66b and a lower rear piece 66c in order from the front.

The pieces are sewn together and integrated at the end edges of the adjacent pieces, except between the lower middle piece 66b and the lower rear piece 66c and at a central portion that is a part between the lower front piece 66a and the lower middle piece 66b. A part between the lower middle piece 66b and the lower rear piece 66c is formed as a slit-like opening 67, so that the cover 6 is formed into a bag shape opened downward. A portion of the central portion, which is a part between the lower front piece 66a and the lower middle piece 66b, is used for inserting an injection nozzle 9 for injecting a urethane foam raw material into the cover 6 at the time of molding the pad body 4 to be described later.

Figure 2:
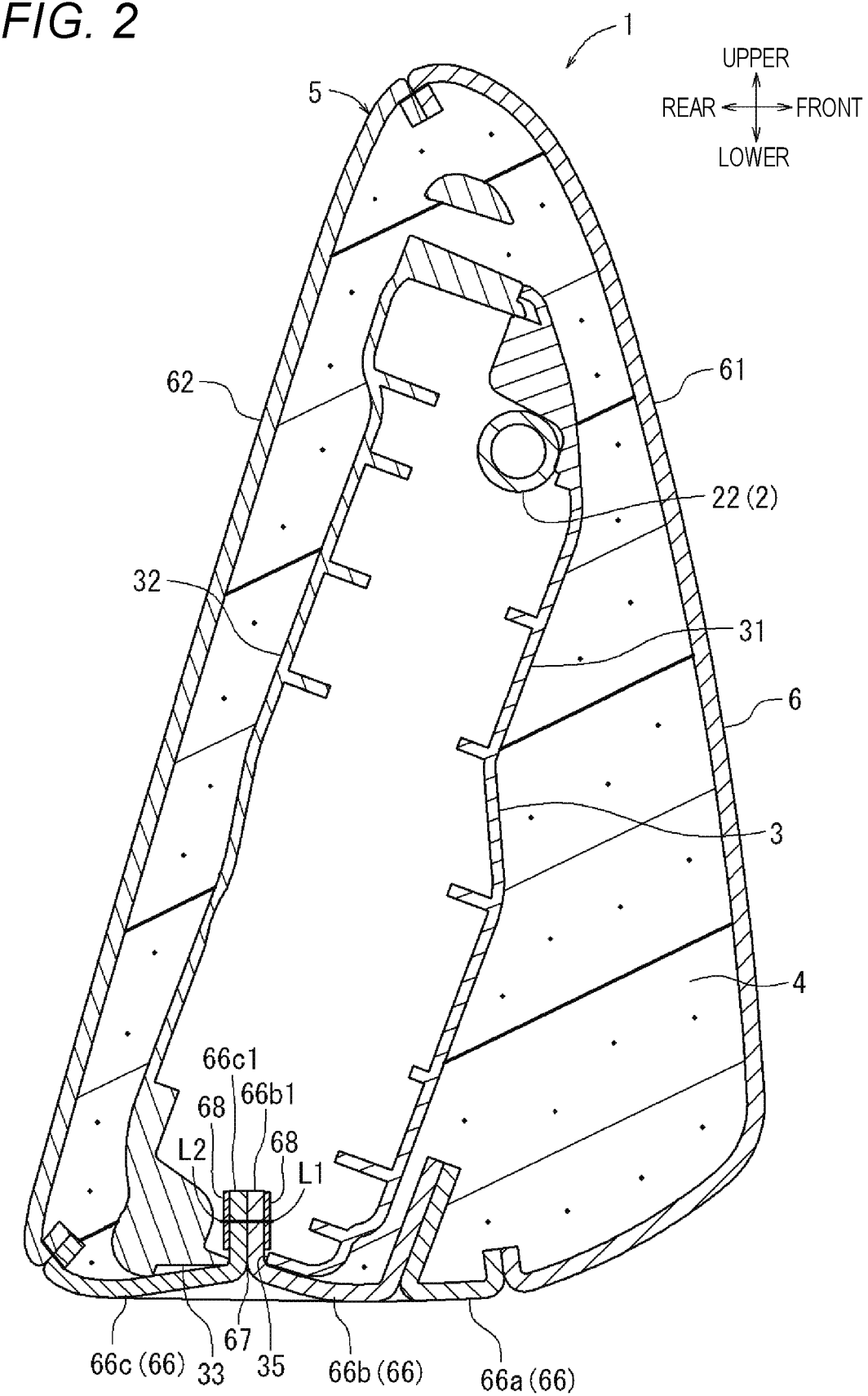
FIG. 2 is a cross-sectional view taken along line II-II of the headrest shown in FIG. 1.

As shown in FIG. 2, a belt-shaped plate 68 made of resin and extending in the left-right direction is sewn with a sewing line L1 and integrated from the front side in close contact with a rear end edge 66b1 of a part of the lower middle piece 66b corresponding to the gap between both legs 21 of the opening 67. The belt-shaped plate 68 is sewn with a sewing line L2 and integrated from the rear side in close contact with a front end edge 66c1 of a part of the lower rear piece 66c corresponding to the gap between both legs 21 of the opening 67. The rear end edge 66b1 of the lower middle piece 66b attached with the plate 68 and the front end edge 66c1 of the lower rear piece 66c attached with the plate 68 are locked to the insert member 3 by being inserted into the slit 35 of the insert member 3 from the terminal side in a superposed state. The rear end edge 66b1 and the front end edge 66c1 are provided with notches (not shown) for allowing both legs 21 to pass through. Here, the rear end edge 66b1 and the front end edge 66c1 each correspond to the "end edge". Further, the plate 68 corresponds to the "plate member.

Figure 3:
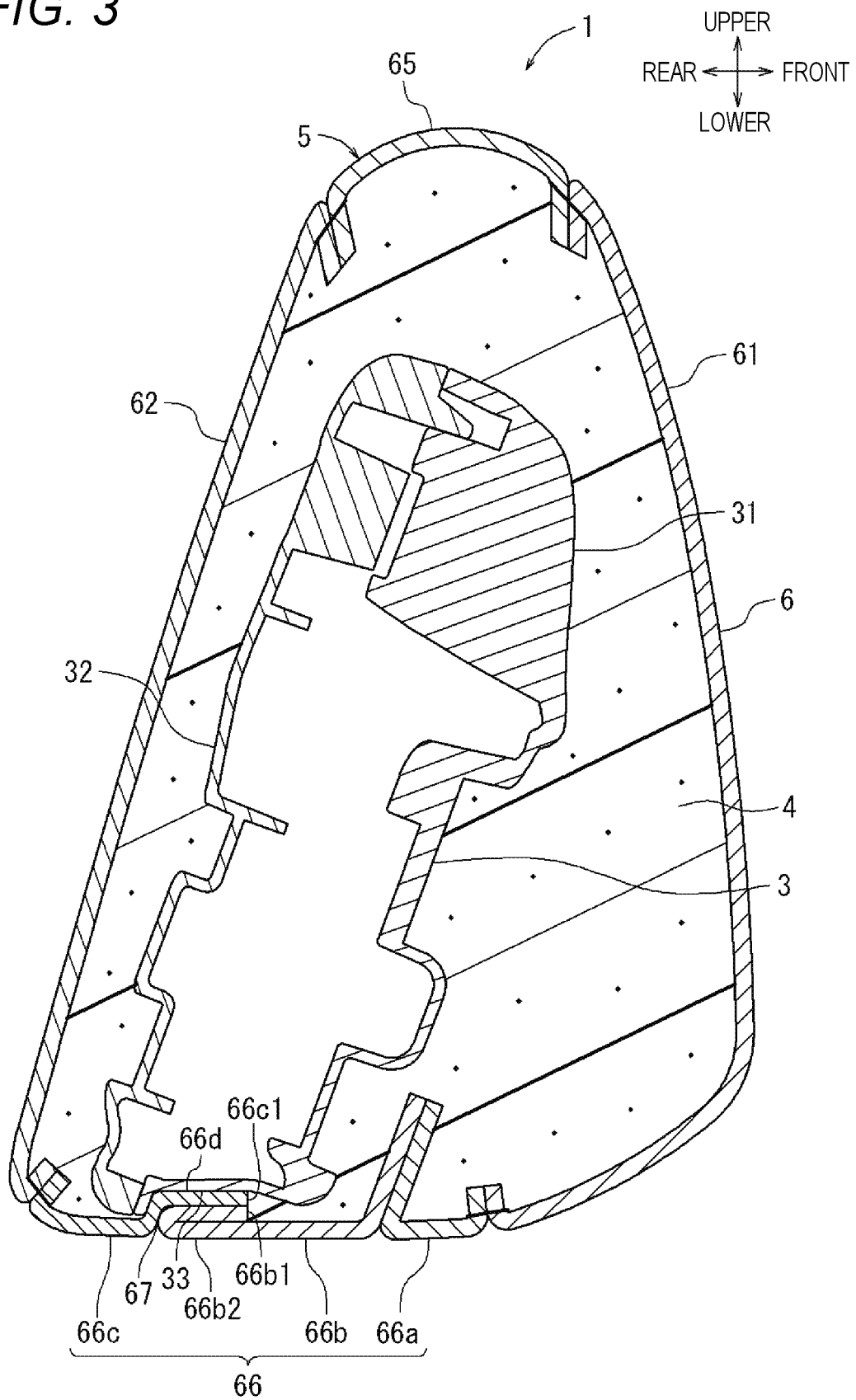
FIG. 3 is a cross-sectional view taken along line III-III of the headrest shown in FIG. 1.

As shown in FIG. 3, the rear end edge 66b1 of portions of the lower middle piece 66b corresponding to both left and right side portions (outer sides in the headrest width direction) of both legs 21 of the opening 67 are folded back forward to form lower overlapping portions 66b2. The front end edge 66c1 of portions of the lower rear piece 66c corresponding to both left and right side portions (outer sides in the headrest width direction) of both legs 21 of the opening 67 extends forward to form overlapping portions 66d overlapped on the lower overlapping portions 66b2 and laminated in three layers together with the lower overlapping portions 66b2. The upper surfaces of the overlapping portions 66d are in contact with the lower surface 33 of the insert member 3.

Figure 4:
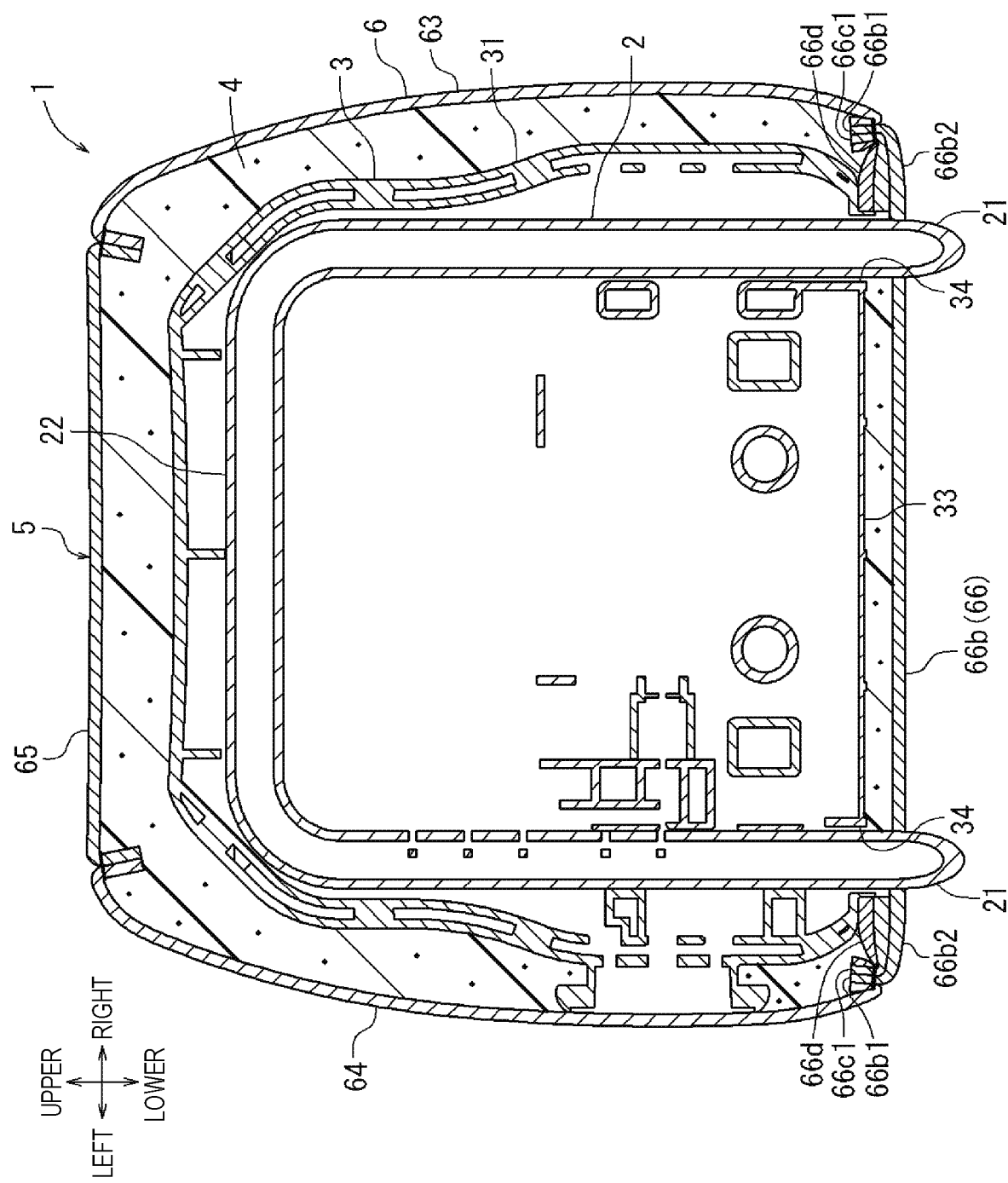
FIG. 4 is a cross-sectional view taken along line IV-IV of the headrest shown in FIG. 1.

As shown in FIGS. 2 to 4, the pad body 4 is a member forming the outer shape of the headrest main body 5, and is formed by filling the space between the front surface side of the insert member 3 other than the lower surface 33 and the back surface side of the cover 6. The pad body 4 is formed of polyurethane foam having a density of 10 kg/m$^3$ to 60 kg/m$^3$. The rear back surface of the lower middle piece 66b and the front back surface of the lower rear piece 66c of the cover 6 are in direct contact with the lower surface 33 of the insert member 3 without the pad body 4 interposed therebetween.

Figure 5:
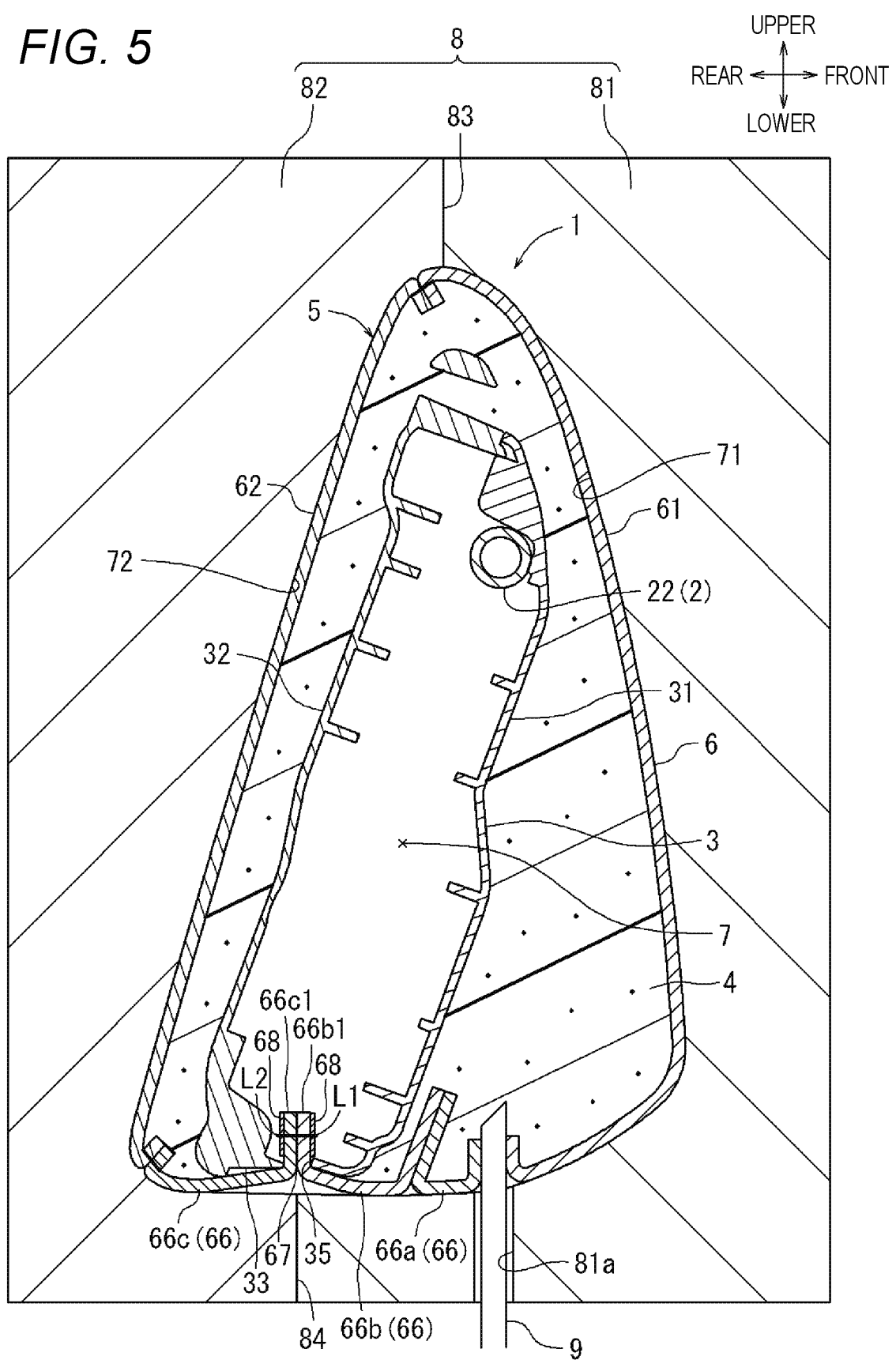
FIG. 5 is a view for explaining a step of manufacturing the headrest, and is a cross-sectional view corresponding to FIG. 2.
Figure 6:
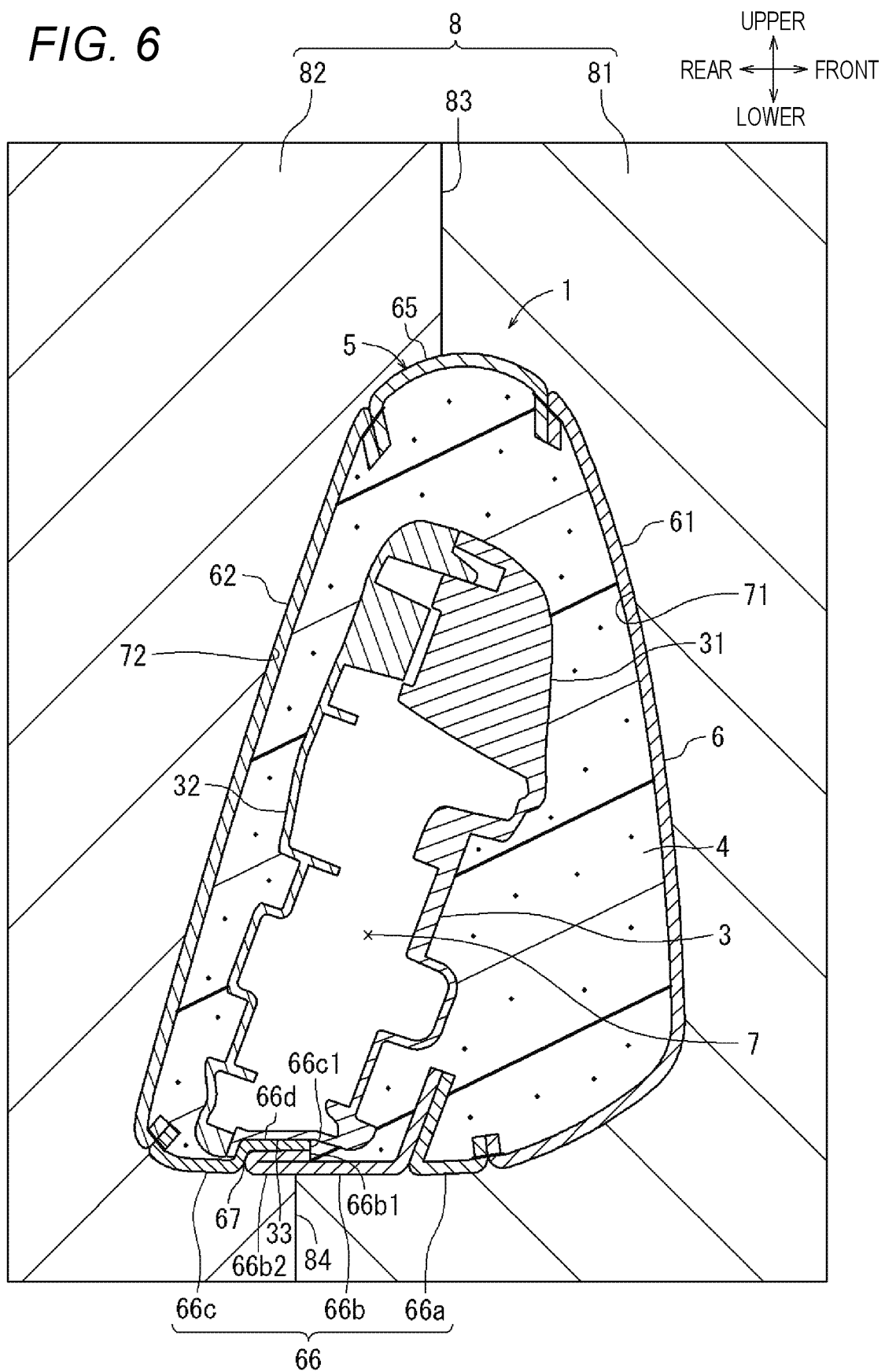
FIG. 6 is a view for explaining a step of manufacturing the headrest, and is a cross-sectional view corresponding to FIG. 3.
Figure 7:
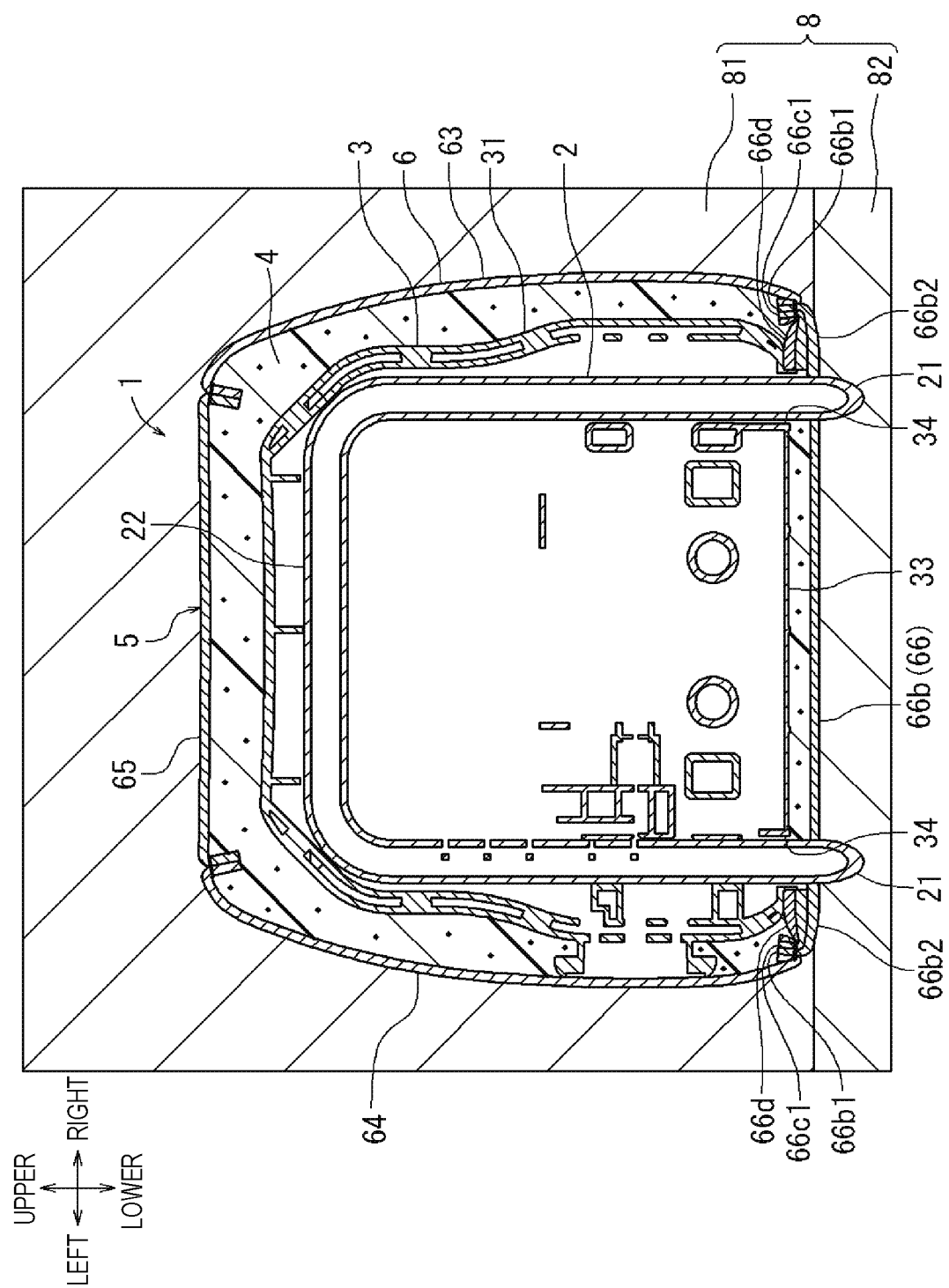
FIG. 7 is a view for explaining a step of manufacturing the headrest, and is a cross-sectional view corresponding to FIG. 4.

A method of manufacturing the headrest 1 will be described with reference to FIGS. 5 to 7. First, in a insert member preparation step, the front member 31 and the rear member 32 are adhered or welded to be joined in a state in which the upper end side of both legs 21 of the headrest stay 2 and the horizontal portion 22 are disposed between the front member 31 and the rear member 32. As a result, the insert member 3 attached with the headrest stay 2 and provided with the slit 35 in the lower surface 33 is obtained. Next, in a cover preparation step, the front piece 61, the rear piece 62, the right piece 63, the left piece 64, the upper piece 65, and the lower piece 66 cut from the cover material are sewn together to be coupled into the bag-shaped cover 6. At this time, the lower piece 66 is prepared advance by sewing the lower front piece 66a, the lower middle piece 66b attached with the plate 68, and the lower rear piece 66c attached with the plate 68.

When the lower piece 66 is to be sewn to the right piece 63 or the left piece 64, parts of the lower middle piece 66b and the lower rear piece 66c corresponding to both the left and right side portions (the outer sides in the headrest width direction) of both legs 21 are sewn to the right piece 63 or the left piece 64 in a state as the overlapping portions 66d.

At this time, in order to stabilize the shape of the overlapping portions 66d, it is convenient to temporarily sew the vicinity of the part to be sewn to the right piece 63 or the left piece 64. Next, in a mold preparation step, a mold 8 having a cavity 7 of a shape corresponding to the outer shape of the headrest main body 5 is prepared. Specifically, a front mold 81 having a front cavity surface 71 corresponding to the outer shape of the front side of the headrest main body 5 and a rear mold 82 having a rear cavity surface 72 corresponding to the outer shape of the rear side of the headrest main body 5 are prepared. An upper parting surface 83 on the upper side of the front mold 81 and the rear mold 82 is provided in a part of the headrest main body 5 corresponding to the upper end, and a lower parting surface 84 on the lower side is provided in a part of the lower surface 33 of the insert member 3 corresponding to the slit 35. The lower parting surface 84 can support both legs 21 of the headrest stay 2 from the front and the rear. As shown in FIG. 5, the front mold 81 is provided with a through hole 81a extending to the outside from a part of the front cavity surface 71 corresponding to the center portion in the left-right direction of the sewing line between the lower front piece 66a and the lower middle piece 66b when the cover 6 including the insert member 3 is disposed in the cavity 7. The through hole 81a is for inserting the injection nozzle 9 for the urethane foam raw material for molding the pad body 4 in a foam molding step described later. The insert member preparation step, the cover preparation step, and the mold preparation step may be performed in any order, but normally, the mold preparation step is performed first, and the insert member preparation step and the cover preparation step are performed in parallel.

Next, in a setting step, the opening 67 of the cover 6 is opened, and the insert member 3 attached with the headrest stay 2 is inserted therethrough into the cover 6 from the side opposite to the headrest stay 2. The rear end edge 66b1 of the lower middle piece 66b attached with the plate 68 and the front end edge 66c1 of the lower rear piece 66c attached with the plate 68 are inserted into the slit 35 of the insert member 3 from the terminal side in a superposed state. In parallel, the left and right overlapping portions 66d are brought into contact with the lower surface 33 of the insert member 3. In this state, the cover 6 with the insert member 3 wrapped therein is set in the cavity 7 of the mold 8. Specifically, the cover 6 with the insert member 3 wrapped therein is arranged such that the front member 31 of the cover 6 faces the front cavity surface 71 of the front mold 81, and the rear mold 82 is closed to allow the lower parting surface 84 to support both legs 21 of the headrest stay 2 from the front and the rear. Thus, the insert member 3 is fixed to the mold 8 in a state of being covered with the cover 6.

Next, in a foam molding step, the urethane foam raw material is injected into the cover 6 in the mold 8 and is foamed and cured between the insert member 3 and the cover 6 to form and integrate the pad body 4. Specifically, the injection nozzle 9 is inserted to expand a part of the cover 6 in the mold 8 that is not sewn and corresponds to the central portion in the left-right direction of the sewing line between the lower front piece 66a and the lower middle piece 66b, thereby injecting the urethane foam raw material into the space between the insert member 3 and the cover 6. Then, the urethane foam raw material is foamed and inflated, and is cured in a state of pressing the cover 6 against the front cavity surface 71 and the rear cavity surface 72 from the inside. As a result, the headrest main body 5 having a shape corresponding to the shape of the cavity 7 is formed. Finally, in a demolding step, the headrest 1 having the formed headrest main body 5 is demolded from the mold 8.

The present embodiment having the above configurations has the following effects. The cover 6 is attached to the insert member 3 provided with the pad body 4 by overlapping the rear end edge 66b1 and the front end edge 66c1 of the bag-shaped cover 6 in a state of each being attached with the plate 68, and inserting and locking the same into the slit 35 provided in the insert member 3. Accordingly, the appearance is not impaired even if the lower side of the headrest main body 5 with the cover 6 attached to the lower surface 33 of the insert member 3 is not covered with an outer cover attached thereto. Therefore, it is possible to obtain a headrest 1 having good appearance quality while preventing an increase in the number of components without using a component such as an outer cover.

Since the manufacture of the headrest 1 allows to form the outer shape of the headrest main body 5 and to integrate the cover 6, the pad body 4, and the insert member 3 at the same time by the integral foam molding of the pad body 4, the headrest 1 can be manufactured rationally. Further, in the cover preparation step, the parts of the lower middle piece 66b and the lower rear piece 66c corresponding to both the left and right side portions (the outer sides in the headrest width direction) of both legs 21 are sewn to the right piece 63 or the left piece 64 in a state as the overlapping portions 66d. Then, in the setting step, the cover 6 with the insert member 3 wrapped therein is set in the cavity 7 of the mold 8 in a state in which the left and right overlapping portions 66d are in contact with the lower surface 33 of the insert member 3. At this time, since the left and right overlapping portions 66d are arranged in a compressed state between the lower surface 33 of the insert member 3 and the surface of the cavity 7, it is possible to prevent damage to the appearance quality of the lower side of the headrest main body 5 due to foaming and curing of the urethane foam raw material leaked to the lower surface 33 of the insert member 3 during the process of integral foam molding of the pad body 4.

Although specific embodiments have been described above, the present invention is not limited to external appearances and configurations in the embodiments, and various modifications, additions, and deletions may be made without changing the spirit of the present invention. Examples of the embodiments include the following matters.

1. In the above-described embodiment, the headrest 1 is manufactured by integrally foam molding the pad body 4 between the insert member 3 and the cover 6. However, the present invention is not limited thereto, and the headrest 1 may be manufactured by foam molding the pad body 4 integrally with the insert member 3 and then attaching the cover 6 thereto. In this case, the overlapping portions 66d of the cover 6 are not required.

2. In the above-described embodiment, the insert member 3 is provided with the slit 35, but is not limited thereto, and may also be provided with a bottomed groove-shaped portion to allow the rear end edge 66b1 of the lower middle piece 66b attached with the plate 68 and the front end edge 66c1 of the lower rear piece 66c attached with the plate 68 to be inserted therein in a superposed state.

3. In the above-described embodiment, the present invention is applied to the headrest 1 of the automobile seat, but may also be applied to a headrest of a seat mounted on an airplane, a ship, a train, or the like.

What is claimed is:

1. A headrest comprising:
   an insert member having an inner space covering a stay other than lower portions of both legs of the stay;
   a pad body having a cushion member covering the insert member other than a lower surface of the insert member, the lower surface being formed on a leg side of the headrest;
   a cover covering the pad body, and forming an outer shape of a headrest main body; and
   a strip-shaped plate member attached to an end edge of the cover at a position between the legs in a state where the cover covers the insert member and the legs protrude outward through a cover opening of the cover,
   wherein the lower surface of the insert member is provided with an insert opening extending in a headrest width direction and disposed between the legs,
   wherein the insert opening is a slit connecting the inner space of the insert member to outside of the insert member, and
   wherein the cover is attached to the insert member in a state where the plate member is inserted into the insert opening together with the end edge of the cover and an entirety of the plate member is completely stored within the inner space of the insert member.

2. The headrest according to claim 1, wherein a width dimension of the insert opening in a front-rear direction of the headrest is set to be the sum of twice a thickness of the plate and twice a thickness of the cover.

3. The headrest according to claim 1, wherein the plate member extends in an upper/lower direction.

4. A method for manufacturing a headrest including:
   an insert member having an inner space covering a stay other than lower portions of both legs of the stay;
   a pad body having a cushion member covering the insert member other than a lower surface of the insert member, the lower surface being formed on a leg side of the headrest;
   a cover covering the pad body, and forming an outer shape of a headrest main body; and
   a strip-shaped plate member attached to an end edge of the cover at a position between the legs in a state where the cover covers the insert member and the legs protrude outward through a cover opening of the cover;
   wherein the lower surface of the insert member is provided with an insert opening extending in a headrest width direction and disposed between the legs,
   wherein the insert opening is a slit connecting the inner space of the insert member to outside of the insert member, and
   wherein the cover is attached to the insert member in a state where the plate member is inserted into the insert opening together with the end edge of the cover and an entirety of the plate member is completely stored within the inner space of the insert member;
   the method comprising:
   preparing the insert member to which the stay is attached and having the insert opening on the lower surface;
   preparing the cover with the plate member attached to the end edge;
   preparing a mold having a cavity of a shape corresponding to the outer shape of the headrest main body;
   setting the insert member and the cover in the cavity of the mold with both legs protruding out of the cavity, in a state where the insert member is inserted into the cover from the cover opening and the plate member is inserted into the insert opening together with the end edge of the cover;
   injecting a urethane foam raw material into the cover set in the mold and foaming and curing the urethane foam raw material between the insert member and the cover to form the pad body and integrate the insert member, the cover and the pad body; and
   demolding the headrest in which the cover is integrated with the insert member via the pad body.

5. The method for manufacturing the headrest according to claim 4, wherein
   in the preparation of the cover, in the state where the insert member is inserted into the cover, the cover has overlapping portions as tick portions at outer sides of the legs protruding from the cover opening in the headrest width direction,
   in the setting of the insert member and the cover, in the state where the insert member is inserted into the cover, the overlapping portions are arranged in a compressed state between the lower surface of the insert member and a surface of the cavity at outer side of the legs in the headrest width direction.

* * * * *